No. 765,818. PATENTED JULY 26, 1904.
F. H. CRAGO.
ANIMAL TRAP.
APPLICATION FILED OCT. 28, 1903.
NO MODEL.
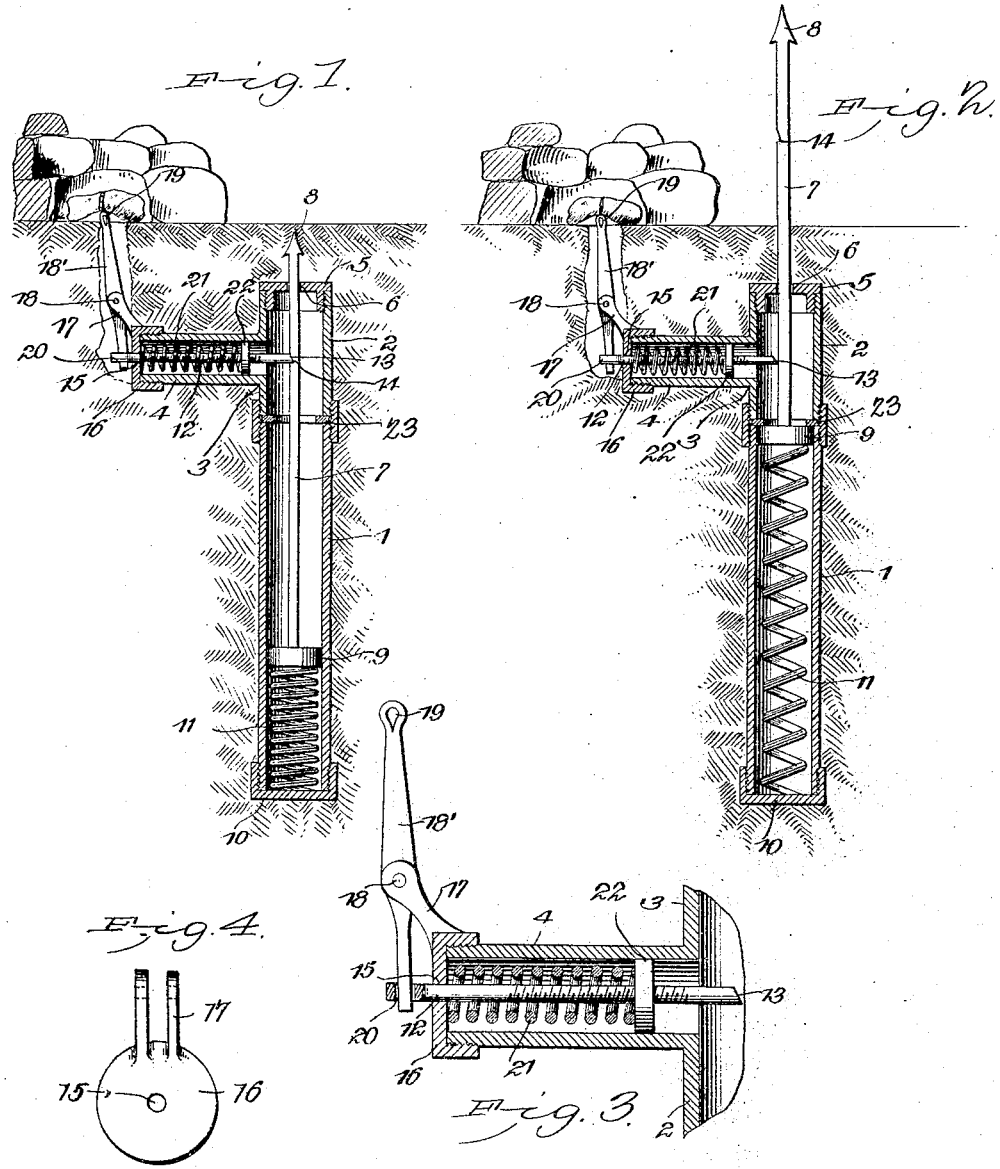
Witnesses
Felix H. Crago, Inventor
Attorneys No. 765,818.

Patented July 26, 1904.

UNITED STATES PATENT OFFICE.

FELIX H. CRAGO, OF BILLINGS, MONTANA.

ANIMAL-TRAP.

SPECIFICATION forming part of Letters Patent No. 765,818, dated July 26, 1904.

Application filed October 28, 1903. Serial No. 178,910. (No model.)

*To all whom it may concern:*

Be it known that I, FELIX H. CRAGO, a citizen of the United States, residing at Billings, in the county of Yellowstone and State of Montana, have invented a new and useful Animal-Trap, of which the following is a specification.

This invention relates to certain improvements in animal-traps, and more particularly to that class commonly known in the art as "impalement-traps."

The object of the invention is to provide an inexpensive and efficient device of this character which is simple in construction and effective in operation, the relative disposition of the several parts being such that when an animal attempts to remove the bait the trap will be sprung and the animal impaled or injured to such an extent as to render escape impossible.

A further object of the invention is to provide a trap in which the operating mechanism is hidden from view and unaffected by the weather, and in which the liability of the trap being accidentally sprung by birds or small animals is obviated.

The invention consists in the construction and novel combination and arrangement of parts hereinafter fully described, illustrated in the accompanying drawings, and pointed out in the claims hereto appended, it being understood that various changes in form, proportion, and minor details of construction may be resorted to without departing from the principle or sacrificing any of the advantages of this invention.

In the drawings, Figure 1 is a vertical sectional view of a trap constructed in accordance with my invention, showing the same set. Fig. 2 is a similar view showing the trap sprung. Fig. 3 is a detail sectional view of the trigger and operating mechanism; and Fig. 4 is an end view of the cap, showing the trigger-supporting arms.

Similar numerals of reference indicate corresponding parts in all the figures of the drawings.

1 designates a hollow tube or casing, formed of metal or other suitable material, embedded in the ground a slight distance below the surface thereof and provided at its upper end with a T-coupling 2, to the stem 3 of which is secured a tubular arm 4. Threaded in the upper end of the coupling 2 is a removable cap 5, provided with a centrally-disposed opening 6, through which passes a spear-rod 7, having a bearded head 8 and provided at its lower end with a plunger 9, which slides freely within the tube or casing. The lower end of the tube or casing is provided with a cap 10, and interposed between said cap and the bottom of the plunger 9 is a heavy coil-spring 11, the normal tendency of which is to force the spear-rod 7 upwardly, as clearly shown in Fig. 2 of the drawings. Slidably mounted within the tubular arm 4 is a trigger-bar 12, one end of which is inclined or beveled, as shown at 13, and adapted to engage a recess 14, formed in the upper end of the rod 6 and by means of which said rod is retained within the tube or casing, the opposite end of the trigger-bar passing through an opening 15 in a cap 16, threaded on the end of the tubular arm. The cap 16 is provided with a pair of upwardly and outwardly extending ears or lugs 17, between which is pivoted in any suitable manner, as by a pin 18, a trigger 18', one end of which is provided with a loop 19, the opposite end of the trigger passing through an eye 20, formed in the end of the trigger-bar 12. A coil-spring 21 encircles the trigger-bar 12, said spring having one end thereof bearing against the inner face of the cap 16 and its opposite end bearing against an adjustable collar 22, threaded on the trigger-bar, and by means of which the tension of the spring is regulated.

A wire, chain, or similar fastening medium passes through the loop 19 and is secured to the bait, so that any attempt to remove the bait will cause the trigger to trip and spring the trap. An inwardly-extending ring or flange 23 is interposed between the upper end of the tube or casing and the T-coupling, the object of which is to form a stop for the plunger when the trap is sprung and limit the upward movement thereof.

In operation the trap is embedded in the ground a sufficient distance to permit the head of the spear to lie slightly below the surface thereof when the trap is set, as clearly shown in Fig. 1 of the drawings. The bait is then attached to the end of the trigger by means of a cord, wire, or the like and surrounded with rocks, logs, or other debris, leaving an opening directly over the head of the spear through which the animal may insert its head in order to grasp the bait. The trap being set, should the animal attempt to steal the bait the pull thereon will cause the trigger to tilt and withdraw the trigger-bar from the recess in the spear-rod, the spring forcing the spear upwardly to a position shown in Fig. 2 of the drawings, impaling the animal or injuring it to such an extent as to prevent its escape.

When it is desired to reset the trap, the head of the spear is forced downwardly until the recess in the rod registers with the trigger-bar, when the spring will force the trigger-bar in said recess and lock the spear within the tube or casing.

By adjusting the tension of the spring 21 the trap may be adapted for catching large or small animals, and the liability of the trap being accidentally sprung by birds is effectively prevented by reason of the strong pull which it is necessary to exert on the bait in order to spring the trap.

Having thus described my device, what I claim, and desire to secure by Letters Patent, is—

1. A trap comprising a tube or casing, a hollow arm or extension secured thereto, a spring-actuated spear provided with a trigger-bar-engaging means slidably mounted within the casing, a trigger-bar mounted within the hollow arm and adapted to engage the spear, a trigger connected to the trigger-bar, and a spring for normally throwing said trigger-bar in engagement with the spear.

2. A trap comprising a tube or casing, a hollow arm or extension secured thereto, a spring-actuated spear provided with a trigger-bar-engaging means slidably mounted within the casing, a trigger-bar provided with an inclined end portion adapted to engage the spear, a spring for normally throwing the bar in engagement with the spear, an adjustable collar carried by the trigger-bar for regulating the tension of the spring, and a trigger connected to the trigger-bar.

3. A trap comprising a tube or casing, a hollow arm or extension secured to the casing, a spring-actuated spear slidably mounted within the casing and provided with a trigger-bar-engaging recess, a removable cap provided with outwardly and upwardly extending lugs secured to the arm or extension, a trigger-bar slidably mounted within the arm or extension, and having one end engaging the recess in the spear, the opposite end thereof passing through an opening in the cap, and being provided with a loop or eye, a trigger pivoted between the lugs or the cap and having one end thereof passing through the eye or loop in the trigger-bar, said trigger-bar being provided with a spring and an adjustable collar for regulating the tension thereof.

4. A trap comprising a tube or casing, a T-coupling secured to the upper end of the casing and provided with a centrally-perforated removable cap, a spring-actuated spear slidably mounted within the casing and provided at its upper end with a trigger-bar-engaging recess, a tubular arm or extension secured to the stem of the T-coupling, a removable cap threaded to the end of the arm or extension, a trigger-bar slidably mounted within the arm and having one end engaging the recess in the spear and the opposite end thereof passing through the cap, a trigger connected to the end of the trigger-bar, a spring carried by the trigger-bar, and means for adjusting the tension of the spring.

5. A trap comprising a tube or casing, a hollow arm or extension secured thereto, a spring-actuated spear, slidably mounted within the casing and provided with a trigger-bar-engaging recess, a trigger-bar mounted within the arm or extension, a trigger connected to the trigger-bar, a spring carried by the trigger-bar, and means for regulating the tension of the spring.

In testimony that I claim the foregoing as my own I have hereto affixed my signature in the presence of two witnesses.

FELIX H. CRAGO.

Witnesses:
 FRANK SHOWERS,
 J. T. HAMMOND.